UNITED STATES PATENT OFFICE.

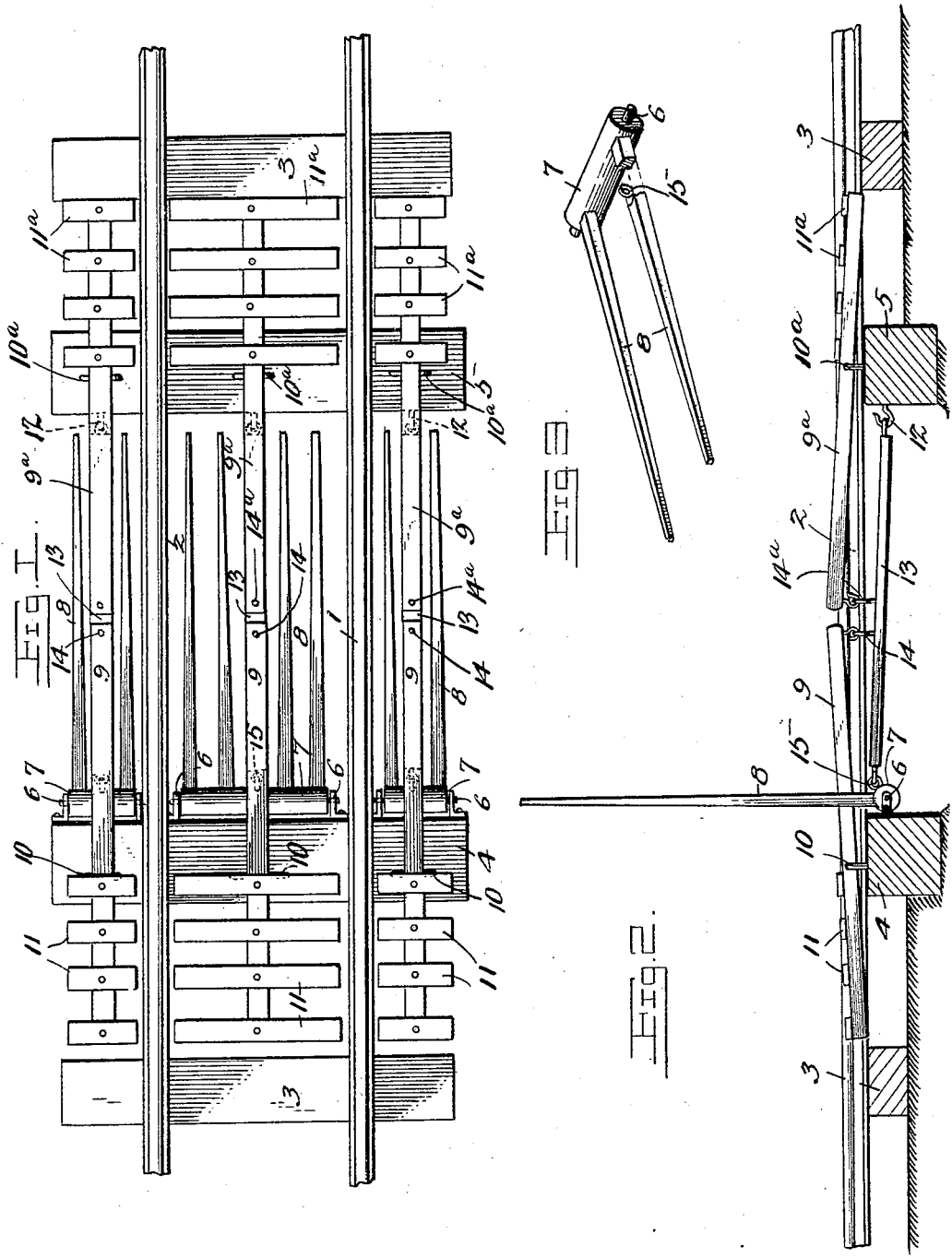

ARNETT CONWAY, OF LOUISVILLE, KENTUCKY, ASSIGNOR OF ONE-HALF TO THOMAS KEY MANSON, OF SAME PLACE.

CATTLE-GUARD.

SPECIFICATION forming part of Letters Patent No. 682,135, dated September 3, 1901.

Application filed June 10, 1901. Serial No. 63,951. (No model.)

*To all whom it may concern:*

Be it known that I, ARNETT CONWAY, a citizen of the United States, residing at Louisville, in the county of Jefferson and State of Kentucky, have invented a new and useful Cattle-Guard, of which the following is a specification.

This invention has for its object the production of a device employed in connection with the cattle-guards of railroads which will remain inactive when not required and will not therefore offer any obstructions to the passing trains, but which will be elevated by the act of any animal that attempts to pass along the railway-tracks from one field or inclosure to another or upon the railway right of way at railway-crossings; and the invention consists in the construction, combination, and arrangement of parts, as hereinafter shown and described, and specifically pointed out in the claims.

This device will be generally installed in ordinary open cattle-guards of railways at road-crossings and where farm-fences cross railway-tracks, but may with slight modifications be employed at any point upon a railway-line where a cattle-guard is required; but for the purpose of illustration I have shown it in the drawings applied to an ordinary open cattle-guard.

Figure 1 represents a plan view, and Fig. 2 a longitudinal sectional elevation. Fig. 3 is a detail view of one of the pivoted sections of the cattle-guard.

The railway-rails are represented at 1 and 2, the ties at 3, and the side or sill timbers of the cattle-guard at 4 and 5, of the ordinary construction. One of the sill-timbers, as 4, will be arranged in alinement with the fences at the sides of the track, these fences not being shown.

Pivotally attached by their ends, as at 6, to the inner faces of the sill-timber 4 are a series of rollers or bars 7, one bar being arranged outside the rails on each side and one of the bars between the rails, as shown. Attached to these rollers 7 are pickets or guards 8, spaced apart and close enough together so that when elevated, as in Fig. 2, they form a closure across the open space between the ends of the fences above referred to.

When the device is arranged to protect the gaps in fences crossing the railway-tracks, where the cattle can approach from both sides or where the guard is designed to prevent animals from passing from one field to the other, means must be provided whereby the pickets can be elevated by the action of the animals when approaching from either side; but when arranged to protect gaps in fences at wagon-road crossings where it is needed only to prevent animals from passing in one direction then the means for operating the pickets may be placed so as to be acted on from one side only.

The means for actuating the pickets consists of long levers 9, supported pivotally upon the timbers 4 by standards 10, there being one of these levers for each of the rollers or bars 7, and each lever projecting at one end outward or away from the pickets 8 and provided with transverse cleats 11 or otherwise arranged with a laterally-extended upper surface to afford a sure footing for the animals. The inner ends of the lever 9 are extended inward above the pickets, as shown. Pivoted at one end at 12 to the sill member 5 are lever-arms 13, corresponding to the bars or rollers 7 and levers 9 and connected between their ends by links or flexible couplings 14 to the inner ends of the levers 9. The other ends of the lever-arms are coupled by brackets 15 to the bars or rollers 7, as shown. By this means, it will be readily understood, any downward movement upon the cleats 11 of the levers 9 will throw the lever-arm 13 upward and cause the bracket 15 to elevate the pickets, as shown in Fig. 2, and form a barrier across the opening over the railway-tracks. Thus if an animal attempts to pass through the gap in the fence the moment it places its foot upon the outer end of any one of the levers 11 the pickets 10 will be suddenly elevated and bar the passage. The brackets 15 being comparatively short and the levers 9 and lever-arms 3 being comparatively long a very slight downward movement of the outer or slatted end of the levers 9 will actuate the pickets.

In localities where the gap in the fence is to be guarded from both sides, as above noted, a duplicate set of the levers 9 and slats 11 will be employed, as shown, the duplicate levers being designated as 9ª, their slats as 11ª, their pivot-brackets as 10ª, and their means of connection to the lever-arms 13 as 14ª. By this means the pickets 8 will be actuated by the animals, no matter from which side approached.

If required, two or more sets of the levers 9 and lever-arms 13 may be arranged in connection with each of the bars or rollers 7, but generally one set with each will be sufficient, as shown.

This makes a very simple, cheap, and easily-erected apparatus which effectually protects the gaps in fences over railway-tracks, while at the same time not interfering with the ordinary uses of the railway.

What I claim as new is—

1. In a cattle-guard, bars pivotally disposed transversely of the railway-track and having pickets connected thereto, an arm or bracket depending from each of said bars, lever-arms each pivotally connected at one end to a stationary support and flexibly connected by the other end of said brackets, and means connected with the lever-arms between the ends thereof whereby said lever-arms are raised by the act of the animal when attempting to pass the gap sought to be guarded, substantially as shown and described.

2. In a cattle-guard, a series of bars pivotally disposed transversely of the railway-track, and having pickets connected thereto, an arm or bracket depending from each of said bars, a series of lever-arms each pivotally attached at one end to a stationary support and each connected flexibly by the other end to one of said brackets, and operating-levers located above the said bars and extending inward beyond the same and connected with the lever-arms between the ends thereof, substantially as shown and described.

3. In a cattle-guard, a series of bars having pickets projecting therefrom and pivotally disposed transversely of the railway-track, a series of levers poised adjacent to said bars and located above the same and having transverse extensions adapted to extend the surface of the levers laterally, and means whereby depression of said extended slatted portion of said levers will actuate said pickets, substantially as shown and described.

In testimony that I claim the foregoing as my own I have hereto affixed my signature in the presence of two witnesses.

ARNETT CONWAY.

Witnesses:
E. J. ANTOINE,
F. J. HUMBERT.